3,137,661
POLYURETHANE FOAM PREPARED FROM AN ADDUCT OF CHLORAL AND A POLYHYDRIC COMPOUND

James S. Rose, Mount Carmel, D. Robert Shine, West Haven, and Joseph V. Karabinos, Orange, Conn., assignors to Olin Mathieson Chemical Corporation
No Drawing. Filed Jan. 5, 1962, Ser. No. 164,607
3 Claims. (Cl. 260—2.5)

The present invention relates to flame retardant, rigid, flexible and semi-rigid polyurethane foams prepared from adducts of monomeric polyhydric alcohols and chloral.

The rigid polyurethane foams have found wide and varied use in industry. For instance, they may be used as core materials between skins of many and varied compositions. In aircraft construction the foam may be enclosed between aluminum or fiber glass reinforced polyurethane skins to form an assembly which is rigid, strong and yet remarkably light. Because of their excellent electrical properties, polyurethane foams enclosed by fiber glass reinforced polyurethane skins have also found use in the construction of radomes. The polyurethane foams have another useful property, they develop a high degree of adhesion during the foaming process. As a result they will adhere to skins composed of such varied materials as metals, polyurethanes, ceramics, glass, etc. The resulting sandwich-type assemblies lend themselves well for use in such diverse fields as in the construction and insulation industries.

Flexible and semi-rigid polyurethane foams have also found wide and varied use in industry, for example, the flexible foams may be used in furniture for cushioning, in packaging, in mattresses, in automobile seats and sun visors, etc. and semi-rigid foams may be used in automobile crash pads and packaging, etc.

Heretofore, numerous attempts have been made to impart flame retardance to polyurethane foams in view of the numerous applications where a flame retardant polyurethane foam is desirable. A typical method for imparting flame retardance to polyurethane foams includes the use of flame retardant additives, such as antimony trioxide. Although these processes achieve a certain degree of flame retardance, the additives employed are not chemically combined in the foam, but are merely present in mechanical admixture; therefore, permanent and uniform flame retardance cannot be obtained. In addition, the flame retardant additives are progressively lost during the process, thus increasing the cost, and also frequently degrading desirable properties of the foam. An additional problem presented in flexible polyurethane foams is that the foam will melt when it burns and the melt is also flammable, thus providing a dangerous running fire.

It is, therefore, an object of the present invention to provide a rigid, flexible or semi-rigid polyurethane foam with built-in flame retardance.

It is a further object of the present invention to provide a flame retardant polyurethane foam which may be easily and expeditiously prepared and which is characterized by good physical properties.

Further objects and advantages of the present invention will appear hereinafter.

In accordance with the process of the present invention it has now been found that the foregoing objects may be obtained and flame retardant polyurethane foams prepared by reacting together (1) the adduct of chloral and a monomeric polyhydric compound, said adduct having a hydroxyl number between 30 and 800, (2) an organic polyisocyanate in an amount of at least 0.7 NCO groups based on the number of hydroxyl group present, (3) a foaming agent and (4) a reaction catalyst.

Chloral is also known as trichloroacetaldehyde. The adducts of chloral and a monomeric polyhydric compound are chloralhemiacetals and their exact structural formula is not definitely known. In the preparation of the chloralhemiacetals the mole proportion of chloral to polyhydric compound will naturally vary depending upon the particular polyhydric compound employed and the hydroxyl number of the adduct which is desired.

The chloralhemiacetals are low molecular weight monomeric materials. It is surprising to find in accordance with the present invention that high molecular weight polyurethane foams may be prepared directly from the chloralhemiacetals and polyisocyanates without the use of other additives. In addition, the chloralhemiacetals are heat sensitive and will revert back to the starting materials, i.e., when external heat is applied to the chloralhemiacetals they will break down to the original polyol and chloral. Therefore, it is surprising to find in accordance with the present invention that in the exothermic foaming reaction no decomposition occurs. In addition, chloralhemiacetals frequently have a high room temperature viscosity and the application of external heat is often necessary in order to obtain the proper reaction viscosity. It is surprising, therefore, to find that even when the high viscosity materials are employed and external heat is applied, no decomposition of the chloralhemiacetal occurs in the foaming reaction.

The use of chloralhemiacetals in the preparation of polyurethane foams is especially desirable since no decrease in hydroxyl function occurs when the polyhydric compound is reacted with chloral despite the fact that each chloral group reacted destroys a hydroxyl group. This is explained by the fact that an additional hydroxyl group is created when the chloral reacts. This is important in that it readily allows the attainment of chloralhemiacetals of predetermined hydroxyl number.

In the preparation of adducts of the present invention any monomeric polyhydric compound may be employed. The polyhydric compound contains at least two hydroxyl groups and may be aliphatic or aromatic, saturated or unsaturated. The preferred polyhydric compounds are glycerol and pentaerythritol due to availability and ease of reaction. Others which may be employed include, but are not limited to, the following: ethylene glycol, propylene glycol, 1,4-butanediol, diethylene glycol, dipropylene glycol, neopentyl glycol, triethylene glycol, hexamethylene glycol, hexanetriol, butanetriol, trimethylol propane, trimethylol ethane, polyglycerol, dipentaerythritol, polypentaerythritol, erythritol, mannitol, sorbitol, 2-butene-1,4-diol, 2-butyne-1,4-diol, p,p'-isopropylidenediphenol, resorcinol, catechol, hydroquinone, alkyl glucosides, such as methyl glucoside, 4,4'-dihydroxy-benzophenone, lactose, sucrose, glucose, etc.

The temperature of the reaction between the polyhydric compound and chloral will naturally vary depending upon the reactants employed, amounts thereof, and the reaction time. Generally, however, the reaction is conducted in the temperature range of between about 50 and 150° C. Similarly, the reaction time will also vary depending upon the temperature of the reaction, the reactants employed, and the amounts thereof. Generally, however, a reaction time in the range of between about 30 minutes and 10 hours is employed.

In some cases it may be desirable to use an inert organic solvent in order to facilitate the reaction. This is especially desirable where the polyhydric compound employed is sensitive to elevated temperatures, such as in the cases of alkyl glucosides, lactose, sucrose and glucose. Typical solvents include dioxane, benzene, xylene, etc.

The chloralhemiacetals may then be used in the preparation of polyurethane foams containing a high, built-in halogen content. They may be used in the preparation of rigid, semi-rigid or flexible polyurethane foams. When the chloralhemiacetals are employed in the preparation of rigid polyurethane foams the molar ratio of chloral to polyhydric alcohol should be such that the resultant material has a hydroxyl number between 300 and 800. In the semi-rigid polyurethane foams the hydroxyl number of the adduct should be between about 100 and 300. In the flexible polyurethane foams the hydroxyl number should be between about 30 and 100.

Any organic polyisocyanate may be employed in the preparation of the polyurethane foams. This includes diisocyanates, triisocyanates, and polyisocyanates. Naturally the organic diisocyanates are preferred due to commercial availability, especially mixtures of isomers of tolylene diisocynate which are readily available commercially. Typical exemplificative isocyanates include, but are not limited to, the following: methylene-bis-(4-phenyl isocyanate), 3,3'-bitolylene-4,4'-diisocyanate, 3,3'-dimethoxy-4,4'-biphenylene diisocyanate, naphthalene-1, 4-diisocyanate, hexamethylene diisocyanate, 1,4-phenylene diisocyanate, etc. The amount of isocyanate employed in the preparation of the polyurethane foams should be sufficient to provide at least 0.7 NCO groups based on the number of hydroxyl groups present in the adduct of the present invention, the number of hydroxyl groups in any additive employed and the number of hydroxyl groups employed in the blowing agent. An excess of isocyanate compound may be conveniently employed; however, this is generally undesirable due to the high cost of the isocyanate compounds. It is preferable, therefore, to employ no greater than 1.5 NCO groups based on the number of hydroxyl groups and preferably between about 0.9 and 1.1 NCO groups.

The polyurethane foams are prepared in the presence of a foaming agent and a reaction catalyst. The foaming agent employed may be any of those known to be useful for this purpose, such as water, the halogenated hydrocarbons and mixtures thereof. Typical halogenated hydrocarbons include, but are not limited to, the following: monofluorotrichloromethane, difluorodichlohomethane, 1,1,2-trichloro-1,2,2-trifluoroethane, methylene chloride, chloroform, and carbon tetrachloride. The amount of blowing agent employed may be varied within a wide range. Generally, however, the halogenated hydrocarbons are employed in an amount from 1 to 50 parts by weight per 100 parts by weight of the adduct of the present invention, and generally the water is employed in an amount of from 0.1 to 10 parts by weight per 100 parts by weight of the adduct of the present invention.

The polyurethane foams are prepared in the presence of a catalytic amount of a reaction catalyst. The catalyst employed may be any of the catalysts known to be useful for this purpose, including tertiary amines and metallic salts. Typical tertiary amines include, but are not limited to, the following: N-methyl morpholine, N-hydroxyethyl morpholine, triethylene diamine, triethylamine, trimethylamine. Typical metallic salts include, for example, the salts of antimony, tin and iron, e.g., dibutyltin dilaurate, stannous octoate, etc. Generally speaking, the catalyst is employed in an amount from 0.1 to 2.0 percent by weight based on the adduct of the present invention.

The polyurethane foams of the present invention may be prepared directly from the reaction between the chloralhemiacetal and organic polyisocyanate in the presence of a foaming agent and reaction catalyst. Optionally, various additives may be employed in the preparation of the polyurethane foams in order to achieve particular properties. Exemplificative of such additives include, but are not limited to, the following: monocarboxylic acids, polycarboxylic acids, polyesters, monohydroxy compounds, polyhydroxy compounds, etc.

Some of the chloralhemiacetals employed in the present invention are characterized by a high room temperature viscosity. In these cases in order to prepare the polyurethane foam it will be necessary to apply heat in order to reduce the viscosity or to admix a material of lower viscosity. This may be conveniently accomplished by admixing a lower viscosity chloralhemiacetal with the higher viscosity chloralhemiacetal.

It is preferred in the preparation of the polyurethane compounds of the present invention to employ minor amounts of a surfactant in order to improve the cell structure of the polyurethane foam. Typical of such surfactants are the silicone oils, and soaps. Generally up to 2 parts by weight of the surfactant is employed per 100 parts of adduct.

Various additives can be employed which serve to provide different properties, e.g., fillers, such as clay, calcium sulfate, or ammonium phosphate may be added to lower cost and improve physical properties. Ingredients such as dyes may be added for color, and fibrous glass, asbestos, or synthetic fibers may be added for strength. In addition, plasticizers, deodorants and anti-oxidants may be added.

The present invention will be more readily apparent from a consideration of the following illustrative examples.

*Example 1.—Preparation of Dichloralhemiacetal of Pentaerythritol*

Pentaerythritol, 272 g. (2 moles), and chloral, 590 g. (4 moles), were added to a two liter, three-neck flask equipped with a stirrer, thermometer and reflux condenser. The mixture was heated while it was rapidly stirred and as the solid slowly dissolved there was a detectable exotherm over and above the normal heating rate. After about 30 minutes the exotherm subsided and heating was continued for two hours at a temperature of 95 to 119° C. At the end of the two hour period 750 ml. of dioxane were added to the hot mixture, during rapid stirring, followed by 40 g. of powdered sodium bicarbonate. The mixture was filtered and the filtrate stripped at vacuo to constant weight. The resultant dichloralhemiacetal of pentaerythritol was recovered in 95% yield, 815 g., and had a hydroxyl number of 495.

*Example 2.—Preparation of Dichloralhemiacetal of Glycerol*

Glycerol, 92.1 g. (1 mole), and chloral, 295 g. (2 moles), were reacted together in a manner after Example 1 for one hour and 15 minutes at a temperature of 95–100° C. The product was recovered in a manner after Example 1 in an amount of 267 g. (70% yield) and had a hydroxyl number of 552.

*Example 3.—Preparation of Trichloralhemiacetal of Dipentaerythritol*

Dipentaerythritol, 254 g. (1 mole), and chloral, 442 g. (3 moles), were reacted together in a manner after Example 1 for 2½ hours at 100–128° C. The product was recovered in a manner after Example 1 in an amount of 663 g. (95% yield) and had a hydroxyl number of 422.

*Example 4.—Polyurethane Foam From Example 1*

A pre-polymer was prepared by heating for 30 minutes at 75° C. a mixture of one mole equivalent of the compound of Example 1 and 2.25 mole equivalents of a mixture of isomers of tolylene diisocyanate (about 80% 2,4-tolylene diisocyanate and 20% 2,6-tolylene diisocyanate). The compound of Example 1, 43 grams, was mixed with 25 grams of chloroform at a temperature of 60° C. The resulting mixture was added to 100 grams of the pre-polymer prepared above. To the resulting mixture was added 0.2 gram of stannous octoate and 1 gram of silicone oil. The mixture was stirred, poured into a mold and allowed to cure at room temperature to a rigid polyurethane foam having a fair cell structure. The polyurethane foam was non-burning when subjected to the standard ASTM method D1692-59T flame test.

*Example 5.—Polyurethane Foam From Example 3*

A rigid polyurethane foam was prepared from the compound of Example 3 in a manner after Example 4. The resulting rigid polyurethane foam had an irregular cell structure and was non-burning when subjected to the standard ASTM method D1692–59T flame test.

*Example 6.—Polyurethane Foam From a 1:1 Mixture of Examples 1 and 2*

A pre-polymer was prepared by heating together for 30 minutes at 75° C. one mole equivalent of an equimolar mixture of the compounds of Examples 1 and 2 with 4 mole equivalents of a mixture of isomers of tolylene diisocyanate (about 80% 2,4-tolylene diisocyanate and 20% 2,6-tolylene diisocyanate). An equimolar mixture of the compounds of Examples 1 and 2, about 66 grams, were mixed with 25 grams of dichlorotrifluoroethane at 110° F. The resulting mixture was added to 100 grams of the pre-polymer prepared above and 0.5 gram of stannous octoate and 1 gram of silicone oil was added. The resulting mixture was stirred, poured into a mold and allowed to cure at room temperature. The resulting rigid polyurethane foam had a large cell structure and was self extinguishing when subjected to the standard ASTM method D1692–59T flame test.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A polyurethane foam prepared by the process which comprises reacting together (1) the adduct of chloral and a monomeric polyhydric compound, said adduct having a hydroxyl number between 30 and 800, (2) an organic polyisocyanate in an amount of at least 0.7 NCO groups based on the number of hydroxyl groups present in the presence of (3) a foaming agent and (4) a reaction catalyst.

2. A polyurethane foam according to claim 1 wherein said adduct (1) is the adduct of pentaerythritol and chloral.

3. A polyurethane foam according to claim 1 wherein said adduct (1) is the adduct of dipentaerythritol and chloral.

References Cited in the file of this patent

UNITED STATES PATENTS

| | | |
|---|---|---|
| 2,784,237 | Bruce | Mar. 5, 1957 |
| 2,961,428 | Muller et al. | Nov. 22, 1960 |